US012625083B2

(12) United States Patent
Salmimaa et al.

(10) Patent No.: US 12,625,083 B2
(45) Date of Patent: May 12, 2026

(54) APPARATUS FOR DETECTING DEFECTS IN A DISPLAY MODULE

(71) Applicant: Nokia Technologies Oy, Espoo (FI)

(72) Inventors: Marja Pauliina Salmimaa, Tampere (FI); Miikka Tapani Vilermo, Siuro (FI); Tero Simo Ilari Jokela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/986,911

(22) Filed: Dec. 19, 2024

(65) Prior Publication Data

US 2025/0208057 A1     Jun. 26, 2025

(30) Foreign Application Priority Data

Dec. 21, 2023     (GB) ...................................... 2317981

(51) Int. Cl.
*G01N 21/88* (2006.01)
*G06F 3/041* (2006.01)

(52) U.S. Cl.
CPC ....... *G01N 21/8851* (2013.01); *G06F 3/0416* (2013.01); *G01N 2021/8854* (2013.01)

(58) Field of Classification Search
None
See application file for complete search history.

(56) References Cited

U.S. PATENT DOCUMENTS

| | | | | |
|---|---|---|---|---|
| 2018/0301071 A1* | 10/2018 | Zhang | ..................... | G09G 3/006 |
| 2019/0340739 A1* | 11/2019 | An | .......................... | G06T 7/001 |
| 2023/0042435 A1* | 2/2023 | Nakata | ................... | H04N 23/73 |

* cited by examiner

*Primary Examiner* — Stephen T. Reed
(74) *Attorney, Agent, or Firm* — Nokia Technologies Oy

(57)     ABSTRACT

An apparatus includes: a display module configured to output first light; a detector configured to detect the first light; and a defect detector for detecting one or more defects in the display module, based at least in part on the detected first light, the one or more defects including defects formed at a time of manufacturing.

20 Claims, 13 Drawing Sheets

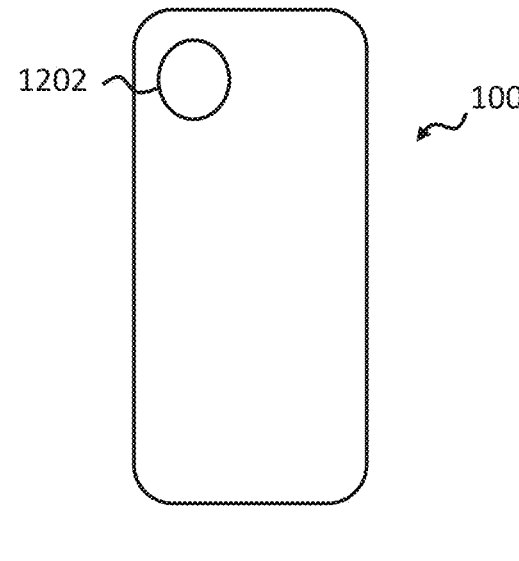
FIG 5
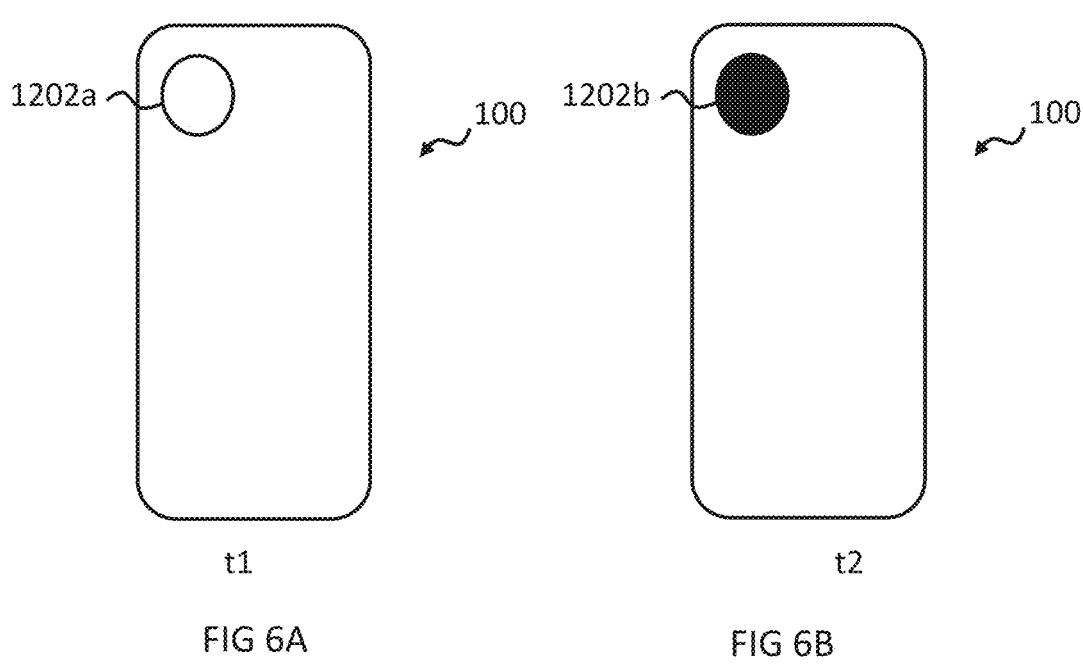
t1
FIG 6A
t2
FIG 6B

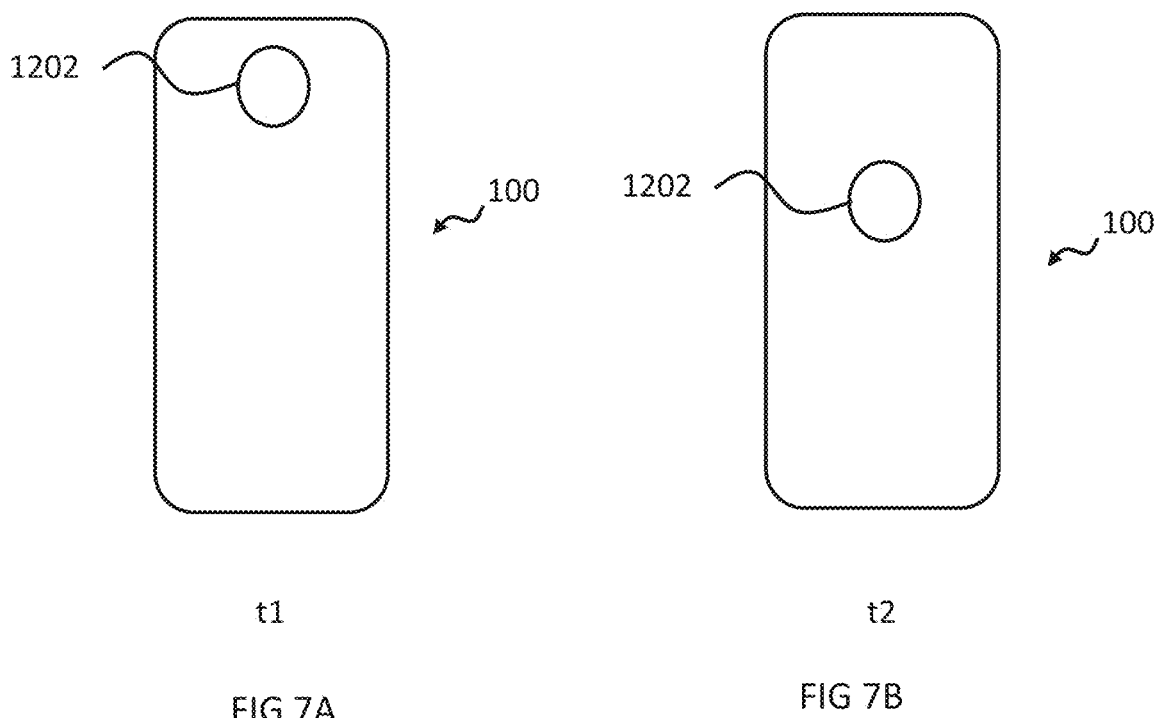
t1
FIG 7A
t2
FIG 7B
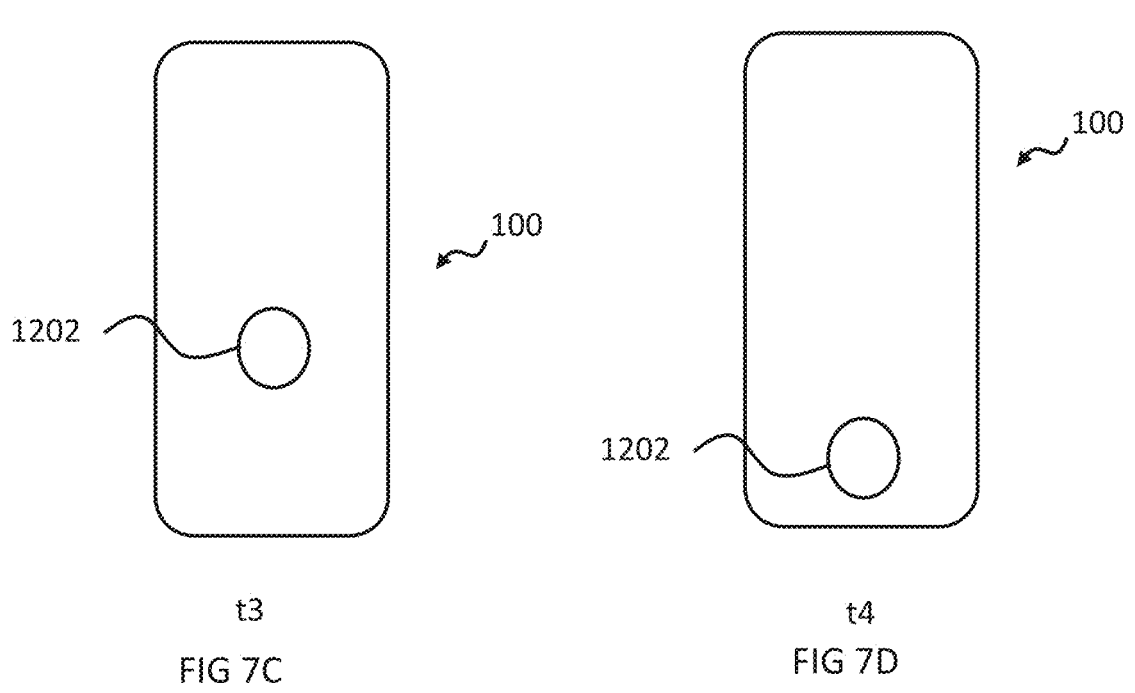
t3
FIG 7C
t4
FIG 7D

100

602

602

102

202

204

302

106

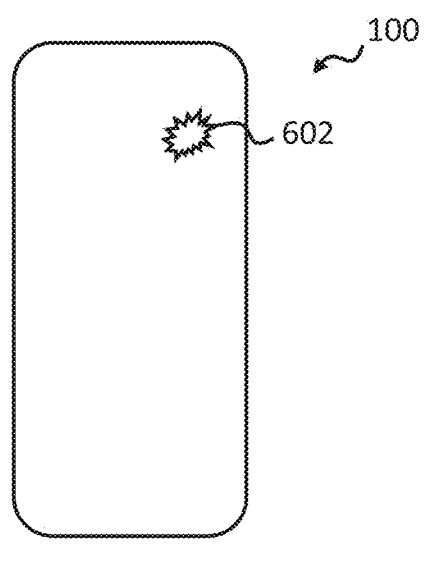
100
602
FIG 10C
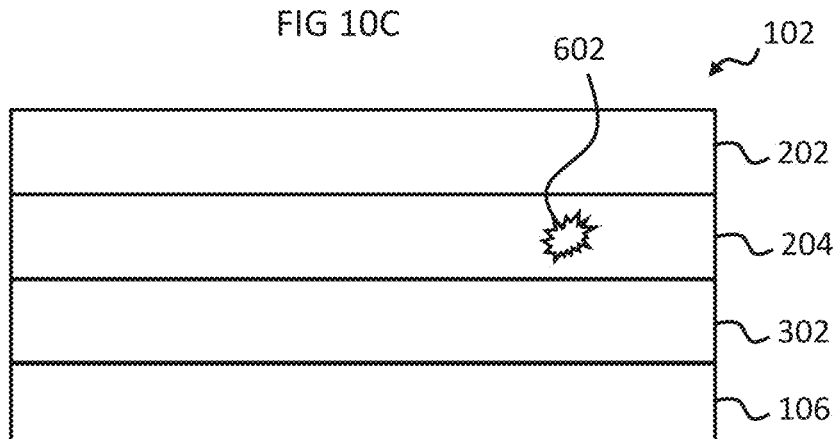
602
102
202
204
302
106
FIG 10D
602
102
202
204
302
106
FIG 10E

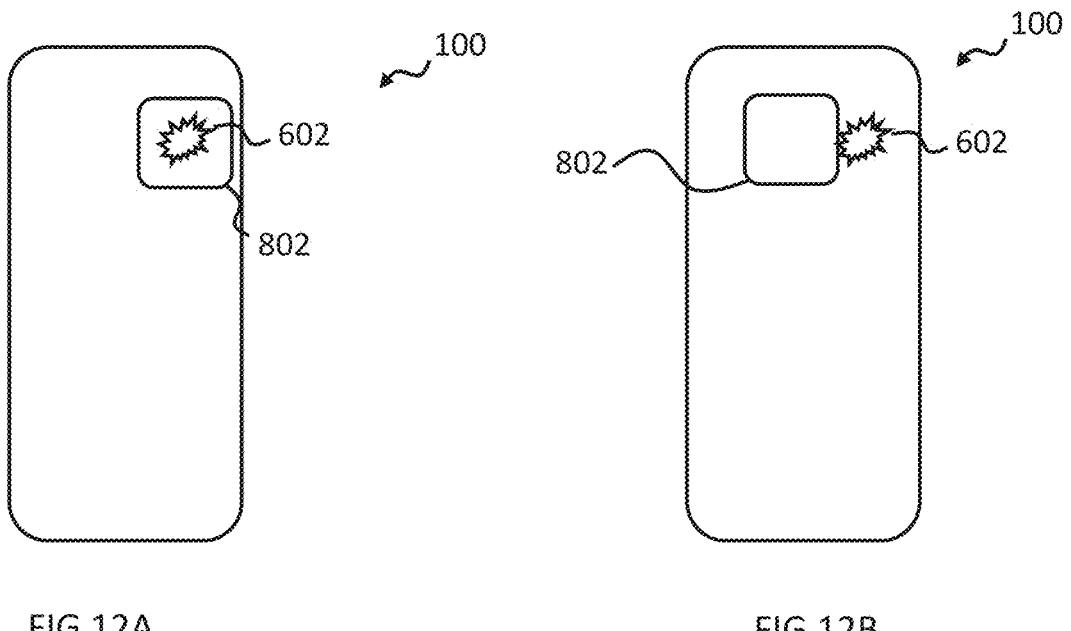
FIG 12A                                    FIG 12B
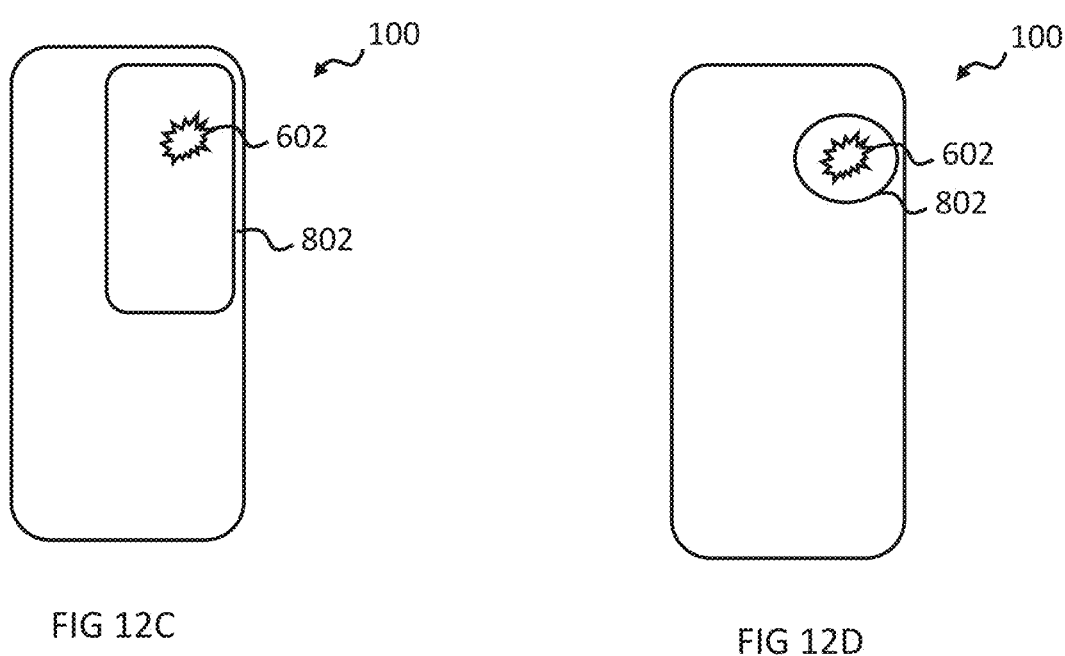
FIG 12C                                    FIG 12D

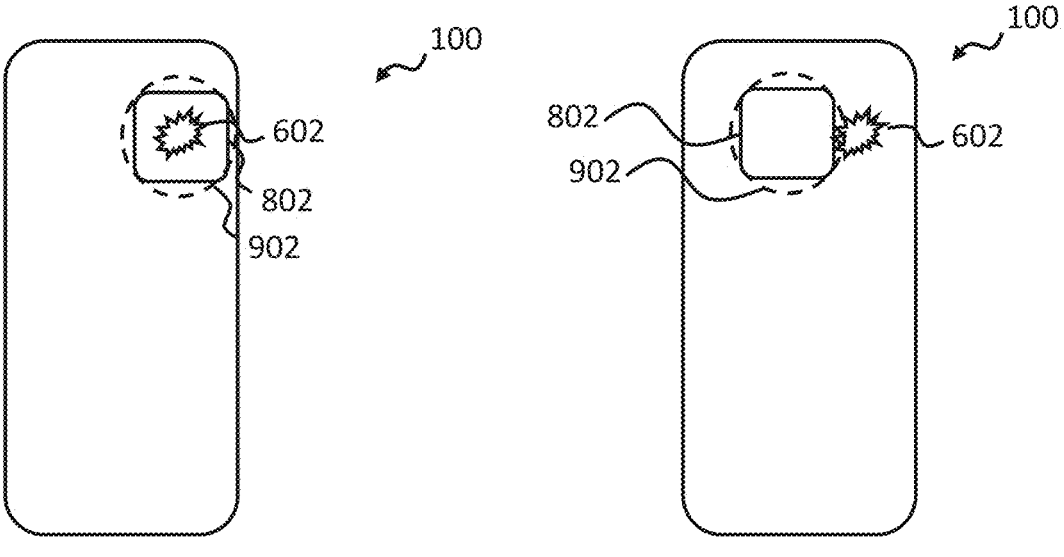
FIG 13A
FIG 13B
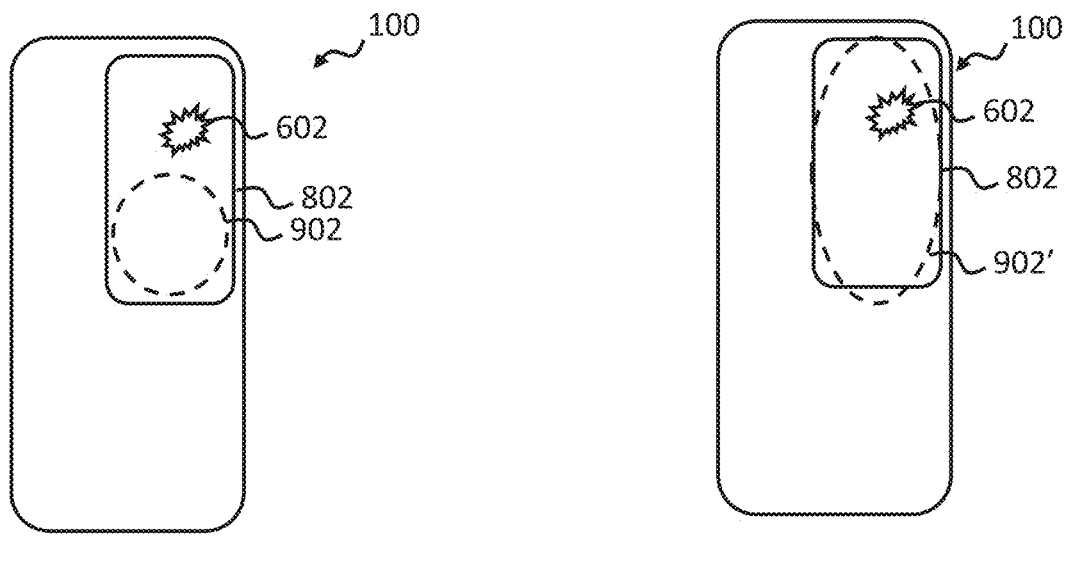
FIG 13C
FIG 13D

100

602

1002

100

1002a

602

1002a

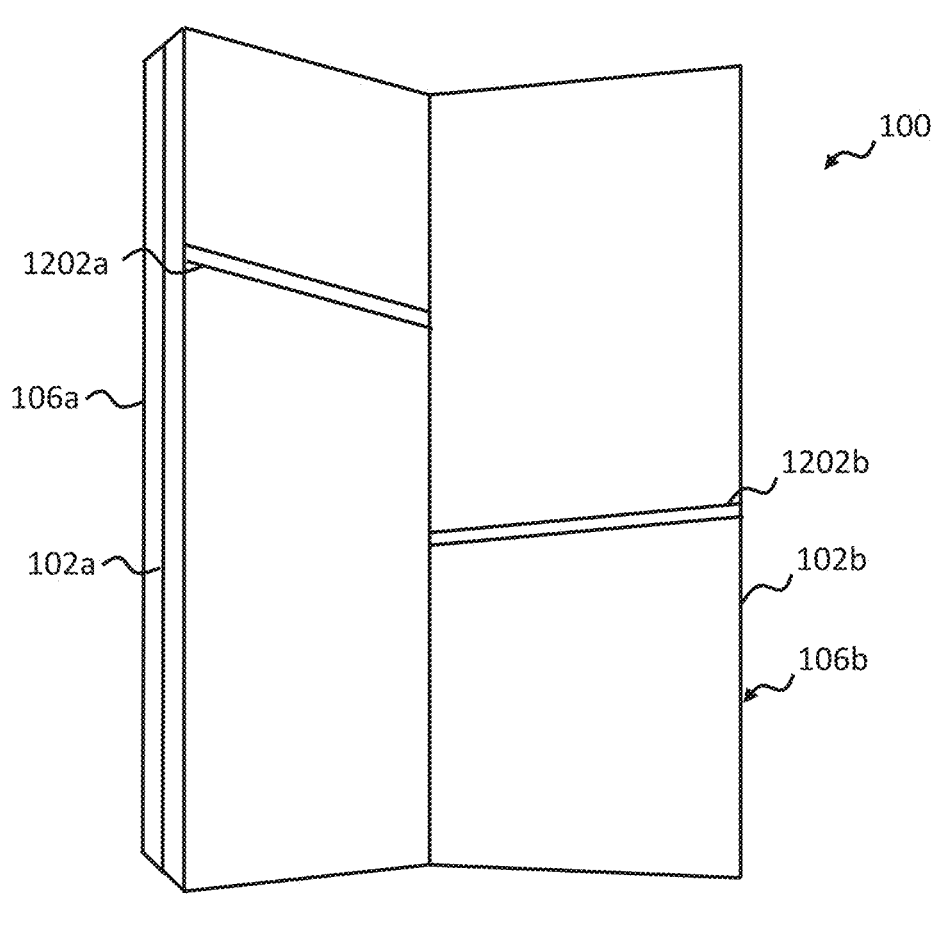
FIG 15
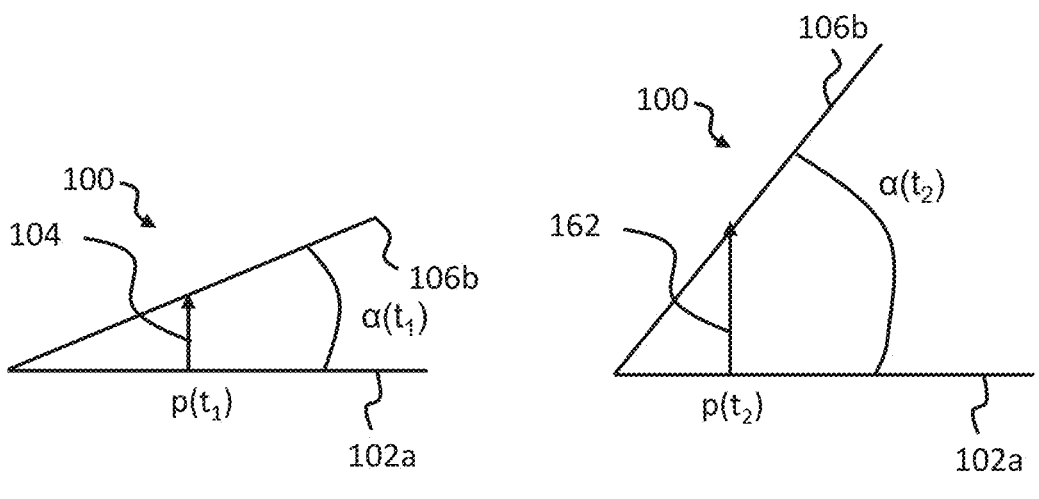
FIG 16A                    FIG 16B

1700

APPARATUS FOR DETECTING DEFECTS IN A DISPLAY MODULE

TECHNOLOGICAL FIELD

Examples of the disclosure relate to an apparatus. Some relate to an apparatus for detection of defects in a display module.

BACKGROUND

Display modules may have several sensing solutions integrated into a layered structure. A display module is susceptible to damage, for example, when a device comprising the display module drops or is impacted by a strong external force.

BRIEF SUMMARY

According to various, but not necessarily all, examples there is provided an apparatus comprising: a display module configured to output first light; a detector configured to detect the first light; and processing means for detecting one or more defects in the display module, based at least in part on the detected first light.

According to various, but not necessarily all, examples there is provided an apparatus comprising means for: at a display module, outputting first light; at a detector, detecting the first light; and at a processing means, detecting one or more defects in the display module, based at least in part on the detected first light.

According to various, but not necessarily all, examples there is provided a method comprising: at a display module, outputting first light; at a detector, detecting the first light; and at a processing means, detecting one or more defects in the display module, based at least in part on the detected first light.

According to various, but not necessarily all, examples there is provided an apparatus comprising: at least one processor; and at least one memory storing instructions that, when executed by the at least one processor, cause the apparatus at least to: at a display module, output first light; at a detector, detect the first light; and at a processing means, detect one or more defects in the display module, based at least in part on the detected first light.

According to various, but not necessarily all, examples there is provided an apparatus comprising outputting means for outputting first light; detecting means for detecting the first light; and processing means for detecting one or more defects in the display module, based at least in part on the detected first light.

According to various, but not necessarily all, examples there is provided an apparatus comprising: at least one processor; and at least one memory including computer program code, the at least one memory and the computer program code configured to, with the at least one processor, cause the apparatus at least to perform: at a display module, outputting first light; at a detector, detecting the first light; and at a processing means, detecting one or more defects in the display module, based at least in part on the detected first light.

According to various, but not necessarily all, examples there is provided a computer program that, when run on a computer, performs: at a display module, outputting first light; at a detector, detecting the first light; and at a processing means, detecting one or more defects in the display module, based at least in part on the detected first light.

According to various, but not necessarily all, examples there is provided a non-transitory computer readable medium comprising program instructions for causing an apparatus to perform at least the following: at a display module, outputting first light; at a detector, detecting the first light; and at a processing means, detecting one or more defects in the display module, based at least in part on the detected first light.

The following portion of this 'Brief Summary' section, describes various features that may be features of any of the examples described in the foregoing portion of the 'Brief Summary' section. The description of a function should additionally be considered to also disclose any means suitable for performing that function.

In some, but not necessarily all examples, the processing means are configured to detect one or more defects which are present in a portion of, but not the whole, display module.

In some, but not necessarily all examples, the display module comprises a plurality of planar layers, the layers comprising: a cover layer; a display; and the detector, wherein the display is positioned between the cover layer and the detector.

In some, but not necessarily all examples, the display module further comprises an input layer configured to detect a user input, the user input comprising at least one of a touch input and a proximity input.

In some, but not necessarily all examples, the processing means are configured to classify the detected one or more defects in the display module, based at least in part on the detected first light.

In some, but not necessarily all examples, the processing means comprise a trained machine learning model configured to classify the detected one or more defects, based at least in part on the detected first light.

In some, but not necessarily all examples, classifying a defect comprises determining at least one of: a defect type of the defect; or a defect position of the defect.

In some, but not necessarily all examples, a defect type of is one of: a cracked cover layer; a display defect; or delamination of layers In some, but not necessarily all examples, a defect position is at least one of: a lateral position indicating a position of the defect within a plane parallel to a planar face of the display module; or a transverse position indicating one or more layers of the display module in which the defect is present.

In some, but not necessarily all examples, the processing means are configured to determine a transfer function wherein the first light is an input to the transfer function and the detected first light is an output from the transfer function, and wherein detecting and/or classifying one or more defects comprises comparing an expected transfer function with the determined transfer function.

In some, but not necessarily all examples, detecting and/or classifying one or more defects comprises comparing at least one of: an intensity, a wavelength, or a spatial distribution of the detected first light with at least one of: an intensity, a wavelength, or a spatial distribution of the first light.

In some, but not necessarily all examples, the processing means are configured to adapt a function of the display module, based at least in part on the detected first light.

In some, but not necessarily all examples, adapting a function of the display module comprises at least one of: changing a display output of the display module; or changing a detection configuration of the input layer.

In some, but not necessarily all examples, changing a display output of the display module comprises changing at least one of: a position, a shape, a color, or a size of a visual object displayed on the display module.

In some, but not necessarily all examples, the processing means are configured to change at least one of: a position, a shape or a size of a visual object on the display module in response to a determination that the visual object is co-located with a defect.

In some, but not necessarily all examples, changing a detection configuration of the input layer comprises: determining that a user input object is co-located with a defect; and changing at least one of: a position, a shape, a color, or a size of the user input object.

In some, but not necessarily all examples, changing a detection configuration of the input layer comprises:

determining that a first input is not possible due to the presence of a defect; and enabling a second input.

In some, but not necessarily all examples, a planar size and shape of the detector is substantially equal to a planar size and shape of the display, and the detector is positioned relative to the display such that a planar face of the display and a planar face of the detector overlap completely.

In some, but not necessarily all examples, the detector comprises a photo detector.

In some, but not necessarily all examples, the display module is removeable and replaceable.

In some, but not necessarily all examples, the apparatus comprises means configured to determine a position and/or an orientation of the apparatus, wherein the display module is configured to output the first light in dependence upon a determination that the position of the apparatus is a first position.

In some, but not necessarily all examples, outputting the first light comprises at least one of: outputting light from a single source; outputting light from a plurality of sources, wherein the plurality of sources do not vary with time; or outputting light from a plurality of sources, wherein the plurality of sources vary with time.

In some, but not necessarily all examples, outputting the first light comprises outputting light of different wavelengths at different locations and/or times.

In some, but not necessarily all examples, the apparatus has a foldable form factor such that: the display module comprises a first portion and a second portion; and the detector comprises a first portion and a second portion.

In some, but not necessarily all examples, the display module is configured to output the first light when an angle between the first portion of the display module and the second portion of the display module is a first angle and to output second light when the angle between the first portion of the display module and the second portion of the display module is a second angle; the second portion of the display module is configured to detect the first light and the second light; and the processing means are configured to detect one or more defects in the display module, based at least in part on at least one of the detected first light or the detected second light.

In some, but not necessarily all examples, the display module is configured to output third light when the first portion of the display module and the second portion of the display module are substantially parallel; the detector is configured to detect the third light; and the processing means are configured to detect one or more defects in the display module, based at least in part on the detected third light.

According to various, but not necessarily all, examples there is provided a device comprising the apparatus.

According to various, but not necessarily all, examples there is provided examples as claimed in the appended claims.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which:

FIG. 5 shows another example of the subject matter described herein;

FIGS. 6A and 6B show another example of the subject matter described herein;

FIGS. 7A-7D show another example of the subject matter described herein;

FIGS. 10A-10E show another example of the subject matter described herein;

FIGS. 12A-12D show another example of the subject matter described herein;

FIGS. 13A-13D show another example of the subject matter described herein;

FIG. 15 shows another example of the subject matter described herein;

FIGS. 16A and 16B show another example of the subject matter described herein;

Figure 1:
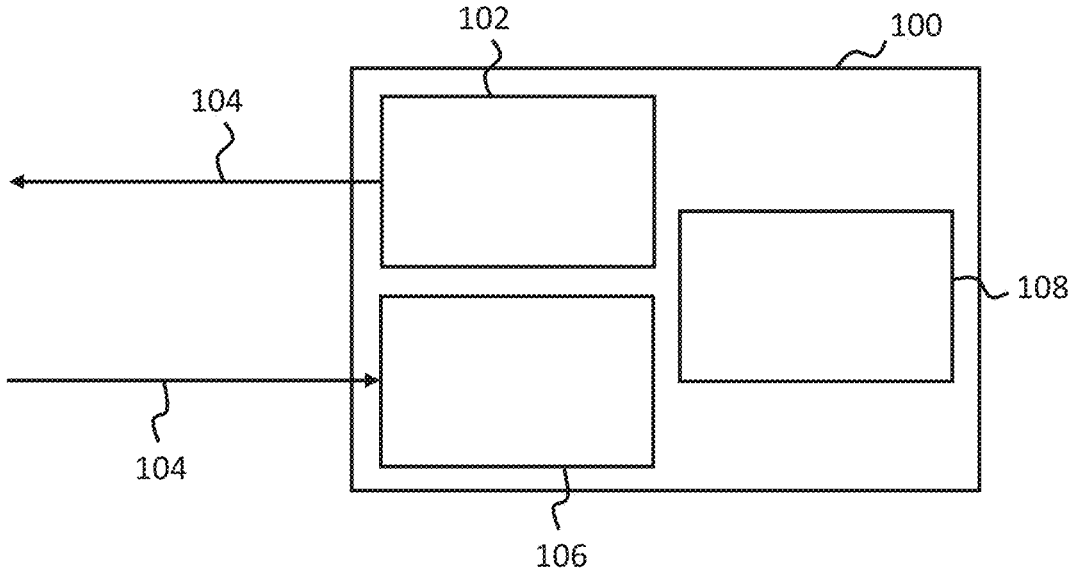
FIG. 1 shows an example of the subject matter described herein.

The figures are not necessarily to scale. Certain features and views of the figures can be shown schematically or exaggerated in scale in the interest of clarity and conciseness.

For example, the dimensions of some elements in the figures can be exaggerated relative to other elements to aid explication. Similar reference numerals are used in the figures to designate similar features. For clarity, all reference numerals are not necessarily displayed in all figures.

DETAILED DESCRIPTION

The following description and the enclosed FIGs relate to various examples of an apparatus 100 comprising a display module 102 configured to output first light 104; a detector 106 configured to detect the first light 104; and processing means 108 for detecting one or more defects 602 in the display module 102, based at least in part on the detected first light 104.

Figure 2:
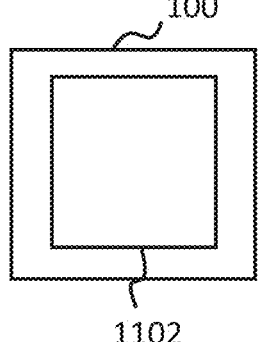
FIG. 2 shows another example of the subject matter described herein.

FIG. 1 schematically illustrates an example of an apparatus 100. FIG. 2 schematically illustrates features of the apparatus 100. Features not illustrated in FIG. 1 are illustrated in FIG. 2.

Figure 3:
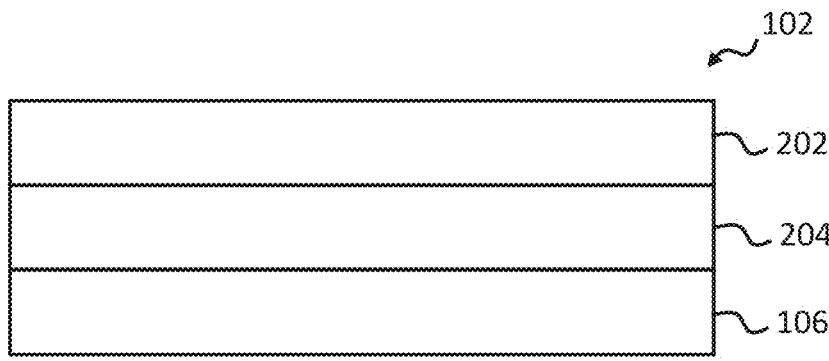
FIG. 3 shows another example of the subject matter described herein.

The apparatus 100 comprises a display module 102. In examples, the display module 102 comprises a plurality of layers, the layers comprising a cover layer 202, a display 204 and the detector 106. In such examples, the display 204 is positioned between the cover layer 202 and the detector 106. FIG. 3 illustrates such an example.

The cover layer 202 is a protective layer. In examples, the cover layer 202 comprises glass.

Figure 4:
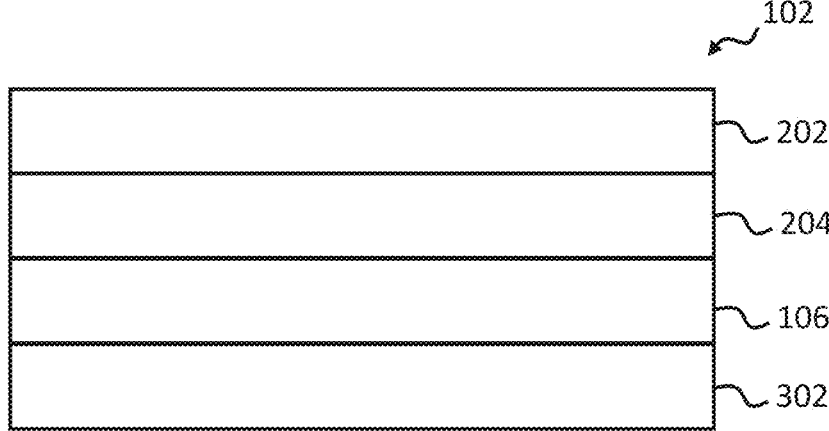
FIG. 4 shows another example of the subject matter described herein.

In examples, the display module 102 comprises further layers. FIG. 4 illustrates an example in which the display module 102 comprises an input layer 302 configured to detect a user input. The user input comprises at least one of a touch input and a proximity input.

In the example of FIG. 4, the input layer 302 is illustrated below the cover layer 202, the display 204 and the detector 106. It will be appreciated that other configurations are possible, for example the input layer 302 may be positioned below the cover layer 202 and display 204 and above the detector 106.

In further examples, the display module 102 comprises any one or more of: one or more strengthening layers; laminations; antireflection coatings; or one or more further layers suitable for use in a display module 102.

In examples, the display module 102 is removable and replaceable. For example, if one or more defects 602 are detected in the display module 102, the display module 102 may be replaced with a new display module 102 in which no defects 602 are present.

The display module 102 is configured to output first light 104. In examples, the display layer 204 is configured to output the first light 104.

In examples, outputting the first light 104 comprises outputting light of different wavelengths at different locations and/or at different times. Therefore, outputting the first light 104 may comprise outputting light of one or more colors at one or more locations and/or at one or more times.

Light may be output from one or more sources 1202. In the below examples, a source 1202 is a light output of a single color.

In examples in which a source 1202 varies in location with respect to time, the source 1202 is dynamic. In examples in which a source 1202 does not vary in location with respect to time, the source 1202 is static. Static sources 1202 and dynamic sources 1202 may be provided as a sequence.

A static source 1202 or a dynamic source 1202 may be a single pixel or a single sub-pixel or a group of pixels, for example, a row of pixels or a cluster of pixels. A static source 1202 may be substantially the whole of the display 204, in other words, a full-screen source 1202.

A source 1202 is displayed on the display module 102 for a period of time. After the period of time has elapsed, the source 1202 is removed from the display module 102.

In the examples of FIGS. 5-7, only one source 1202 is displayed at a time. It will be appreciated that more than one source 1202 may be provided simultaneously or substantially simultaneously.

In examples, such as the example illustrated in FIG. 5, outputting the first light 104 comprises outputting light from a single static source 1202.

In examples, such as the examples illustrated in FIGS. 6A-6B, outputting the light comprises outputting light from a sequence of two or more static sources 1202. FIGS. 6A-6B illustrate a sequence of light outputs at times t1-t2. During a first time period t1 (FIG. 6A) a first source 1202*a* is displayed. During a second time period t2 (FIG. 6B) a second source 1202*b* is displayed.

In examples, t1 and t2 are consecutive time periods. In other examples, t1 and t2 are non-consecutive time periods, for example, a different source 1202 or no source 1202 may be displayed between t1 and t2. In some examples, t1 and t2 are at least partially overlapping time periods. In other examples, there is no overlap between t1 and t2.

In some examples, outputting the first light 104 comprises outputting a sequence of full-screen static sources 1202. For example, light may be output as a sequence of full-screen white; full-screen red; full-screen green; and full-screen blue.

In examples, such as the examples illustrated in FIGS. 7A-7D, outputting the first light 104 comprises outputting light from a dynamic source 1202. FIGS. 7A-7D illustrate a sequence of light outputs at times t1-t4. At t1 (FIG. 7A), the output has a first location; at t2, t3 and t4 (FIGS. 7B, 7C and 7D respectively) the output has second, third and fourth locations respectively.

In some examples, a sequence of two or more dynamic sources 1202 is provided.

In examples, outputting the first light 104 comprises outputting a row of pixels that scans across the display 204.

In some such examples, outputting the first light 104 comprises outputting a sequence of rows of pixels that scan across the display 204. For example, light may be output as a sequence of a white scanning row; a red scanning row; a green scanning row and a blue scanning row.

The apparatus 100 comprises a detector 106 configured to detect the first light 104.

Figure 8:
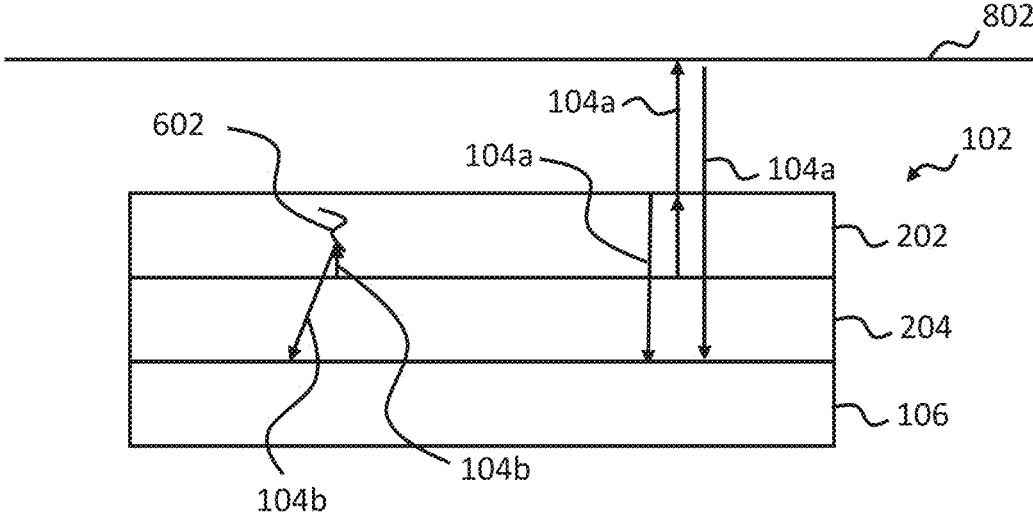
FIG. 8 shows another example of the subject matter described herein.

FIG. 8 illustrates an example in which light is emitted from two positions on the display 204. After being emitted by the display module 102, a portion of the first light 104 is reflected by one or more layers of the display module 102 towards the detector 106. A portion of the first light 104 is refracted by one or more layers of the display module 102. The reflection may be specular reflection or diffuse reflection. For example, reflection by a portion of the display module in which a defect is present may be diffuse reflection. The detector 106 detects the reflected and/or refracted first light 104.

In examples, after being emitted from the display module 102, a portion of the first light 104 is reflected by a surface 802 external to the apparatus 100. The detector 106 detects the reflected first light 104.

In the example of FIG. 8, a first portion of first light 104*a* is reflected by the cover layer 202 and a second portion of first light 104*a* is reflected by an external surface 802.

In examples, a planar size and shape of the detector 106 is substantially equal to a planar size and shape of the display 204, and the detector 106 is positioned relative to the display 204 such that a planar face of the display 204 and a planar face of the detector 106 overlap completely. In other words, the detector 106 is a full-screen detector.

In other examples, such as examples in which a planar size and shape of the display 204 is smaller than a planar size and shape of the cover layer 202, a planar size and shape of the detector 106 is larger than a planar size and shape of the display 204, and the detector 106 is positioned relative to the display 204 such that the planar face of the display 204 is completely overlapped by the planar face of the detector 106.

The detector 106 may comprise any detector capable of detecting light. In examples, the detector 106 comprises a photo detector. In some such examples, the detector 106 comprises an organic photo detector.

In examples, the detector 106 is configured to detect features of the detected first light 104, for example, any one or more of: spatial distribution; wavelength; intensity; luminance; angle of incidence on the detector 106; position of incidence on the detector 106; time between emission from the display 204 and detection at the detector 106. In examples, the detector 106 receives a signal from the display 204 indicating a time of emission of the first light 104.

In examples, such as the example illustrated in FIG. 2, the apparatus 100 comprises means 1102 configured to determine a position and/or an orientation of the apparatus 100. In some such examples, the means 1102 configured to determine a position of the apparatus 100 comprise at least one of: an inertial measurement unit (IMU); a gauge; a potentiometer; a rotary encoder; a magnetic sensor; a proximity sensor; an optical sensor; a sonic sensor; or an orientation sensor. One or more of each type of sensor may be provided.

In such examples, the display module 102 is configured to output the first light 104 in dependence upon a determination that the position of the apparatus 100 is a first position.

In some such examples, the apparatus 100 is face-down in the first position, that is, the display module 102 is positioned below other features of the apparatus 100.

In examples, a processing means 108 of the apparatus 100 is configured to determine, based on an output from the IMU 1102 and an output from a light detector, that the apparatus 100 is face-down on a surface, that is, the display module 102 is positioned below other features of the apparatus 100 and in contact with, or substantially in contact with, a surface of an object. In some such examples, the determination that the apparatus 100 is face-down on a surface is based on a determination by the IMU 1102 that the apparatus 100 is in the first position and a determination by the light detector of low light levels. In examples, the light detector is the detector 106. In other examples, the light detector comprises at least one of: a camera; an ambient light sensor (ALS); an infrared (IR) proximity sensor; or an ultrasonic proximity sensor.

The apparatus 100 comprises processing means 108 for detecting one or more defects 602 in the display module 102, based at least in part on the detected first light 104.

A defect 602 is any feature, object or anomaly present in the display module 102 that impairs, or lowers the quality of, display of content and/or receipt of inputs by the display module 102. A defect 602 may be a feature, object or anomaly that was not present in the display module 102 at the time of manufacturing.

A defect 602 causes a reduction in the quality of display of content by the display module 102, for example it may prevent rendering of visual content in a portion of the display module 102 or impede viewing of visual content in a portion of the display module 102.

A defect 602 may also cause a reduction in the ability of the apparatus 100 to receive a user input. A defect 602 may prevent a portion of the input layer 302 from receiving a touch input. A defect 602 may generate a false touch input, for example by causing the input layer 302 to detect that an input has been received when no input has been made.

Further, a defect 602 may cause injuries. For example, a defect may comprise or cause a sharp edge or piece of broken glass which may injure a user when touched.

Example defects 602 include cracks in one or more layers of the display module 102; dead pixel(s); delamination of layers; broken display; scratches on one or more layers of the display module 102; display bleeding.

In examples, the processing means 108 are configured to detect one or more defects 602 which are present in a portion of, but not the whole, display module 102. For example, the defect 602 may be localized to a particular portion of the display module 102. The display module 102 is able to emit light even when there are one or more defects 602 present.

In examples, detecting one or more defects 602 comprises comparing one or more features of the detected first light 104 with one or more features of the first light 104.

In some examples, the processing means 108 is configured to determine expected features of the first light 104. The expected features may be any one or more of: an expected spatial distribution; an expected wavelength; an expected intensity; an expected angle of incidence on the detector 106; an expected position of incidence on the detector 106; and an expected time between emission from the display 204 and detection at the detector 106.

The expected features of the first light 104 may be determined based on at least one of: a spatial distribution of the emitted first light 104; a wavelength of the emitted first light 104; an intensity of the emitted first light 104; an angle of emission of the emitted first light 104; a position of emission of the emitted first light 104; and a time of emission of the emitted first light 104.

The expected features of the first light 104 may further be determined based on at least one of: a number of layers of the display module 102 positioned above the display layer 204; a thickness of one or more layers of the display module 102 positioned above the display layer 204; or a material of one or more layers of the display module 102 positioned above the display layer 204. In such examples, "above the display layer" refers to features positioned to a side of the display layer 204 to which the cover layer 202 is positioned.

The expected features of the first light 104 may further be determined based on determined contexts external to the apparatus 100. For example, the expected features of the first light 104 may be determined based on any one or more of: a determined surface on which the apparatus 100 is positioned; or a determined ambient light level.

In examples, one or more detected features is compared with one or more expected features, A detected feature of the first light 104 that has a difference from its expected value above a threshold difference is a not expected feature. Therefore:

A detected wavelength of the first light 104 that has a difference from the expected wavelength of the first light 104 above a wavelength threshold difference is a not expected wavelength;

A detected intensity of the first light 104 that has a difference from the expected intensity of the first light 104 above an intensity threshold difference is a not expected intensity;

A detected angle of incidence of the first light 104 that has a difference from the expected angle of incidence above an angle threshold difference is a not expected angle of incidence;

A detected position of incidence of the first light 104 that has a difference from the expected position of incidence above a position threshold difference is a not expected position of incidence; and A detected time between emission from the display 204 and detection at the detector 106 that has a difference from the expected time between emission from the display 204 and detection at the detector 106 above a time threshold difference is a not expected time between emission from the display 204 and detection at the detector 106.

In examples, detection of one or more not expected features of the detected first light 104 indicates one more defects 602 are present in the display module 102.

FIG. 8 illustrates an example in which first light 104 is output from multiple points on the display 204. A first portion of first light 104a is reflected by the cover layer 202 and a second portion of first light 104a is reflected by a surface 802 external to the apparatus 100. First light 104a is detected by the detector 106 with at least one of: an expected spatial distribution; an expected wavelength; an expected intensity; an expected angle of incidence; an expected position of incidence; or an expected time between emission from the display 204 and detection at the detector 106.

In FIG. 8, first light 104b is at least partially reflected by a defect 602 in the cover layer 202. Therefore, at least a portion of first light 104b is detected by the detector 106 with at least one of: a not expected spatial distribution; a not expected wavelength; a not expected intensity; a not expected angle of incidence; a not expected position of incidence; or a not expected time between emission from the display 204 and detection at the detector 106.

Defects 602 of different types have different effects on the features of the first light 104. For example:

When the defect 602 is delamination of layers, an air gap between the layers creates an additional medium and additional interfaces between layers through which the first light travels. This causes, for example, reflection of straight lines as uneven lines.

When the defect 602 is a crack in the cover layer 202, the crack reflects the first light 104 away in multiple directions. Some of the light rays may enter the glass through a rough edge of the crack and become trapped inside due to total internal reflection. As a result, the transparency of the region in which the crack lies is diminished. The cracks may appear opaque or highly translucent due to a combination of irregular reflection, total internal reflection and absorption inside the cover layer 202.

When the defect 602 is a display defect such as an OLED display defect, it may be 'cloud' shaped, and the light may look diffused. In examples, such defects are perceived as color distortions, and the damaged area may flicker In examples, the processing means 108 are configured to classify the detected one or more defects 602 in the display module 102, based at least in part on the detected first light 104.

In examples, classifying a defect 602 comprises determining a defect type of the defect 602. In examples, a defect type is one of: a crack in one or more layers, for example a crack in the cover layer 202; a defect in one or more layers, for example a display defect; or delamination of layers.

Figure 10A:
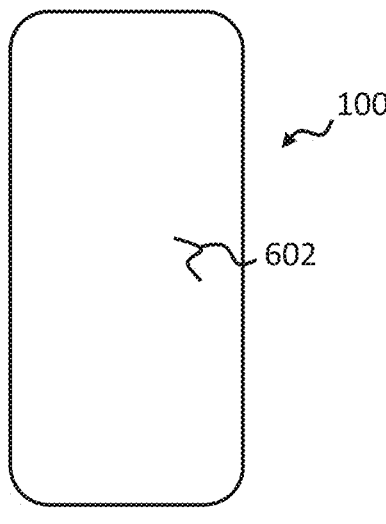
Figure 10B:
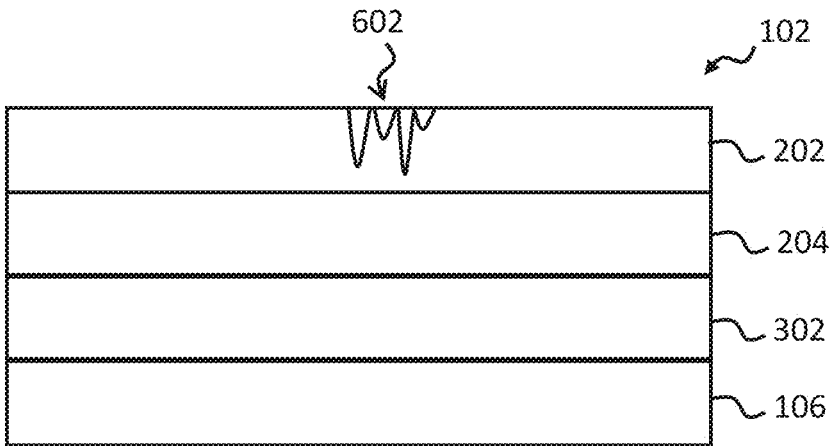

FIGS. 10A and 10B illustrate a top view and a side view of an example in which the cover layer 202 is cracked.

FIGS. 10C and 10D illustrate a top view and a side view of an example in which there is a defect in the display 204.

FIG. 10E illustrates an example in which delamination has occurred between the cover layer 202 and the display 204. Delamination may occur between two other layers or between multiple layers.

In examples, classifying a defect 602 comprises determining a defect location 702 of the defect 602.

Figure 11A:
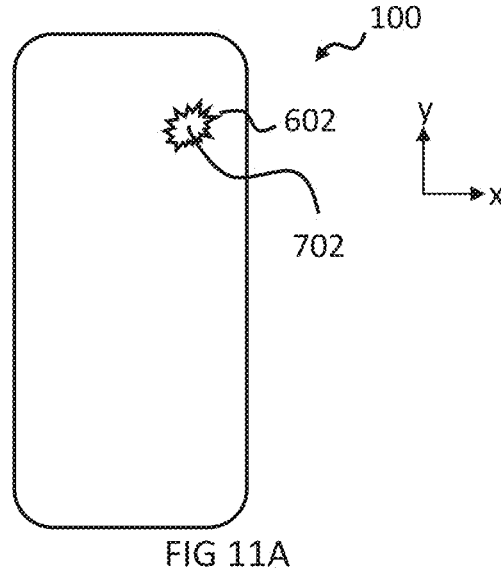
FIGS. 11A and 11B show another example of the subject matter described herein.

In examples, such as the example illustrated in FIG. 11A, a defect location 702 is a lateral position (x,y) indicating a position of the defect 602 within a lateral plane, the lateral plane being parallel to a planar face of the display module 102.

Figure 11B:
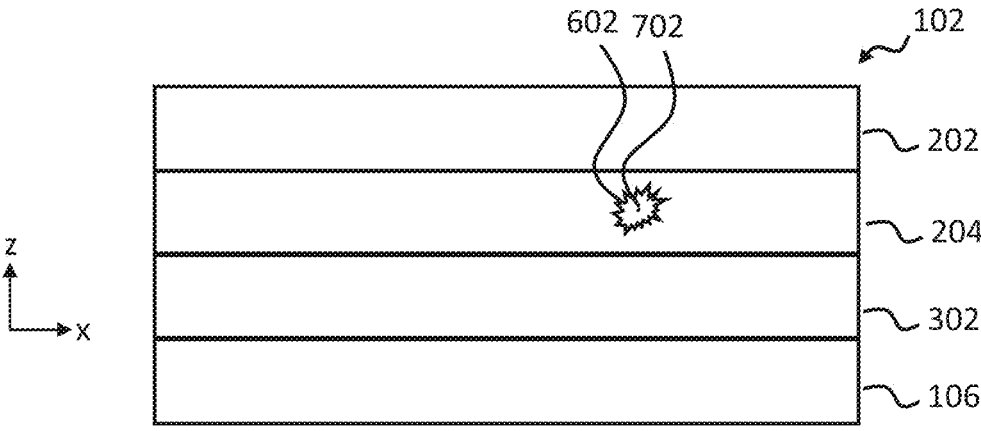

In examples, such as the example illustrated in FIG. 11B, a defect location 702 is a transverse position (z) indicating a position of the defect 602 within a transverse plane, the transverse plane being perpendicular to a planar face of the display module 102, thereby indicating one or more layers of the display module 102 in which the defect 602 is present. A transverse position may indicate one or more layers in which the defect 602 is present, or a transverse position (z) of the defect 602.

In examples, a defect location 702 indicates both a lateral and a transverse position of the defect 602.

In examples, classifying a defect 602 comprises determining a defect size of the defect 602. In examples, a defect size is a two-dimensional size measured within the lateral plane. In other examples, a defect size is a three-dimensional size measured within the lateral plane and the transverse plane.

In some examples, determining a defect size of a defect 602 comprises determining a start point and an end point of the defect 602 along at least one of the x, y, z axes.

In examples, classifying one or more defects 602 comprises comparing one or more features of the detected first light 104 with one or more features of the emitted first light 104 or expected features of the first light 104. For example, a crack in the cover layer 202 may cause dispersion of the first light 104 such that the detected first light 104 comprises different wavelengths and/or a different number of wavelengths to the emitted first light 104. For example, damage to one or more layers may cause diffuse reflection of the first light 104 such that the first light 104 is detected at multiple points on the detector 106.

Figure 9:
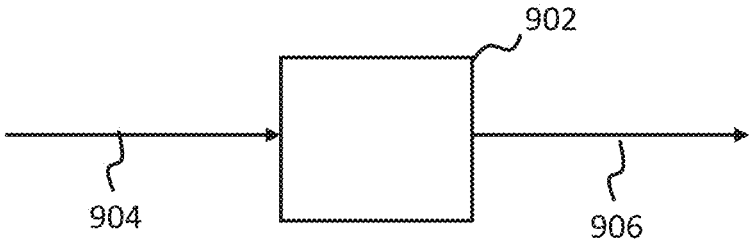
FIG. 9 shows another example of the subject matter described herein.

In examples, the processing means 108 comprise a trained machine learning model 902 configured to classify the detected one or more defects 602, based at least in part on the detected first light 104. FIG. 9 illustrates an example machine learning model 902, configured to receive information from the detector 106 about the detected first light 104 as input data 904 and output a classification of the detected one or more defects 602 as output data 906. The information about the detected first light 104 comprises features of the first light 104.

The machine learning model 902 is trained on a training dataset which comprises examples of display modules in which at least one defect 602 is present and examples of display modules in which no defect 602 is present.

In examples, the machine learning model 902 is further trained during use, for example, the one or more features of the light detected by the detector 106 and/or an image of the light detected by the detector 106 is fed to the training set.

In examples, classifying the one or more defects 602 can be considered as a classification problem which labels input data 904. For example, the input data 904 may be labelled {0,1} where 0 indicates no defect 602 is present and 1 indicates at least one defect 602 is present. Additionally or alternatively, the input data 904 may be labelled {0, 1, 2, 3, . . . } where 0 indicates no defect 602 is present and 1, 2, 3 . . . indicate different types of defect 602, for example 1 may indicate a crack, 2 may indicate a delamination of layers, and 3 may indicate a defect 602 in the display layer 204.

Additionally, a location label may be determined which indicates a portion of the display module 102 in which a defect 602 is present. For example, a transverse location of a defect 602 may be represented as being in one of four quarters of the display module 102 and given a label {0, 1, 2, 3}, where each of 0, 1, 2 and 3 indicate a different quarter of the display module 102. An increased number of portions of the display module 102 increases the accuracy of the location label.

In examples in which the input data 904 comprises an image formed by the light detected by the detector 106, classifying the one or more defects 602 can be considered as an image classification problem. In some such examples, the machine learning model 902 may classify a display module 102 as having a defect 602 (0) or not having a defect 602 (1). Additionally or alternatively, the machine learning model 902 may classify a display module 102 as not having a defect 602 (0) or having a defect 602 of type X (1, 2, 3 . . . ).

Additionally or alternatively, the machine learning model 902 may classify a display module 102 as having a defect 602 in a portion Y of the display module 102 (location label 0, 1, 2, 3 . . . ).

In examples in which the input data 904 comprises an image formed by the light detected by the detector 106, classifying the one or more defects 602 can be considered as a pattern recognition problem or a feature recognition problem. In such examples, the machine learning model 902 may identify defects 602 as objects within the display module 102 and classify their type and location.

In examples in which the input data 904 comprises an image formed by the light detected by the detector 106, classifying the one or more defects 602 can be considered as an image segmentation problem. In such examples, the machine learning model 902 may classify each pixel as not having a defect 602 (0) or having a defect 602 (1), and classify the type of defect 602 (0, 1, 2, 3). By classifying each pixel, the location(s) of defect(s) is also obtained.

In examples, classification of the detected one or more defects 602 is carried out by a convolutional neural network (CNN) based visual recognition model, for example a TensorFlow framework CNN.

In examples the processing means 108 are configured to determine a transfer function wherein the first light 104 is an input to the transfer function and the detected first light 104 is an output from the transfer function.

The expected transfer function is determined based on at least one of: a number of layers present in the display module 102; thickness(es) of layers in the display module 102; material(s) of layers in the display module 102; and features of the first light 104. The determined transfer function is determined based on at least one feature of the detected first light 104.

In such examples, detecting and/or classifying one or more defects 602 comprises comparing an expected transfer function with the determined transfer function.

In examples, the processing means 108 are configured to adapt a function of the display module 102, based at least in part on the detected first light 104.

In examples, adapting a function of the display module 102 is carried out in dependence upon a determination that one or more defects are present in the display module. In examples, adapting a function of the display module 102 is carried out in dependence on output data 906.

In examples, adapting a function of the display module 102 comprises changing a display output of the display module 102.

In some such examples, changing a display output of the display module 102 comprises changing the appearance of a visual object 802 on the display module 102, for example, changing at least one of: a position; a shape; a color; or a size of the visual object 802.

In some examples, the processing means 108 are configured to determine whether a visual object 802 is co-located with a defect, and to change the appearance of a visual object 802 on the display module 102 in response to a determination that the visual object 802 is co-located with a defect 602.

In examples, if a visual object 802 and a defect 602 have at least one position in at least one plane in common, they are co-located. In examples, if a visual object 802 and a defect 602 overlap more than a threshold overlap, they are co-located. In examples, if a visual object 802 and a defect 602 overlap but a portion of the visual object 802, larger than a threshold portion, does not overlap the defect 602, then the visual object 802 and the defect 602 are not co-located. For example, if the portion of the visual object 802 that does not overlap the defect 602 is larger than the portion of the visual object 802 that overlaps the defect 602, then the visual object 802 and the defect 602 are not co-located.

FIGS. 12A-12D illustrate examples in which the display output of the display module 102 is modified in response to a determination that the visual object 802 is co-located with a defect 602.

In FIG. 12A, the visual object 802 and the defect 602 are co-located.

In FIG. 12B, the display output of the display module 102 is modified by changing a position of the visual object 802. In the example of FIG. 12B, the visual object 802 is moved laterally so that it is no longer co-located with the defect 602. In examples, the position of the visual object 802 is changed by a minimum amount necessary to cause the visual object 802 to not be co-located with the defect 602. Additionally or alternatively, the change in the position of the visual object 802 may be determined in dependence on at least one parameter of one or more other visual objects displayed on the display 204. A parameter of a visual object displayed on the display 204 may be: a position of the visual object; a content of the visual object; a transparency level of the visual object; or an importance of the visual object.

In FIG. 12C, the display output of the display module 102 is modified by changing a size of the visual object 802. In the example of FIG. 12C, a length of the visual object 802 is increased so that a portion of the visual object 802 is not co-located with the defect 602. In examples, the size of the visual object 802 is changed by a minimum amount necessary to cause the visual object 802 to not be co-located with the defect 602, for example to cause the portion of the visual object 802 that does not overlap the defect 602 to be larger than the portion of the visual object 802 that overlaps the defect 602. Additionally or alternatively, the change in the size of the visual object 802 may be determined in dependence on at least one parameter of one or more other visual objects displayed on the display 204.

In FIG. 12D, the display output of the display module 102 is modified by changing a shape of the visual object 802. In the example of FIG. 12D, the visual object 802 is changed from a rounded rectangle to an ellipse. A change in shape of the visual object 802 may, for example, permit easier viewing of the display object and/or easier interaction with the display object through the defect 602. Additionally or alternatively, the change in the size of the visual object 802 may be determined in dependence on at least one parameter of one or more other visual objects displayed on the display 204.

The display output of the display module 102 may be modified by changing a color of the visual object 802. For example, the color of the visual object 802 may be changed to be more similar to a color of a defect, or to have more contrast with a color of a defect.

In examples, adapting a function of the display module 102 comprises changing a detection configuration of the input layer 302.

In some such examples, changing a detection configuration of the input layer 302 comprises: determining that a user input object is co-located with a defect 602.

A user input object comprises a visual object 802 and an effective area 902. The effective area 902 is an area in which, if an input is detected, a function associated with the user input object is performed.

In examples, if a user input object and a defect 602 have at least one position in at least one plane in common, they are co-located. In examples, if a user input object and a defect 602 overlap more than a threshold overlap, they are co-located. In examples, if a user input object and a defect 602 overlap but a portion of the user input object, larger than a threshold portion, does not overlap the defect 602, then the user input object and the defect 602 are not co-located. For example, if the portion of the user input object that does not overlap the defect 602 is larger than the portion of the user input object that overlaps the defect 602, then the user input object and the defect 602 are not co-located.

In examples, a user input object and a defect 602 are co-located if both the visual object 802 and the effective area 902 of the user input object are co-located with the defect 602. In examples, a user input object and a defect 602 are co-located if only one of the visual object 802 and the effective area 902 of the user input object are co-located with the defect 602.

In examples, the user input object is changed in dependence upon a determination that the user input object is co-located with a defect 602. Changing the user input object may comprise changing at least one of: a position, a shape, a color or a size of the user input object.

In examples, changing the user input object comprises changing the effective area 902. In some such examples, changing an effective area 902 comprises changing at least one of: a position; a shape; a color; or a size of the effective area 902.

In examples, changing the user input object comprises changing the visual object 802.

FIGS. 13A-13D illustrate examples in which a user input object is changed by changing both the visual object 802 and the effective area 902. In FIGS. 13A-13D, the visual object 802 is illustrated with continuous lines and the effective area 902 is illustrated with dashed lines.

In the example of FIG. 13A, the visual object 802, the effective area 902, and the defect 602 are co-located.

In the examples of FIGS. 13B-13D, the visual object 802 is changed as described in FIGS. 12B-12D.

In the examples of FIGS. 13B and 13C, the detection configuration is modified by changing a position of the effective area 902. In the example of FIG. 13B, the effective area 902 is moved laterally so that it is no longer co-located with the defect 602. In examples, the position of the effective area 902 is changed by a minimum amount necessary to cause the effective area 902 to not be co-located with the defect 602. Additionally or alternatively, the change in the position of the effective area 902 may be determined in dependence on at least one parameter of one or more visual objects not part of the input object which are displayed on the display 204. A parameter of a visual object displayed on the display 204 may be: a position of the visual object; a content of the visual object; a transparency level of the visual object; or an importance of the visual object.

In the example of FIG. 13D, the detection configuration is modified by changing a size of the effective area 902. In the example of FIG. 13C, a length of the effective area 902 is increased so that a portion of the effective area 902 is not co-located with the defect 602. In examples, the size of the effective area 902 is changed by a minimum amount necessary to cause the effective area 902 to not be co-located with the defect 602, for example to cause the portion of the effective area 902 that does not overlap the defect 602 to be larger than the portion of the effective area 902 that overlaps the defect 602. Additionally or alternatively, the change in the size of the effective area 902 may be determined in dependence on at least one parameter of one or more visual objects not part of the input object which are displayed on the display 204.

In examples, changing a detection configuration of the input layer 302 comprises: determining that a first input is not possible due to the presence of a defect 602. For example, it may not be possible for a portion of the display module 102 in which a defect 602 is present to receive the first input. The first input may be a touch input.

Determination that a first input is not possible due to the presence of a defect 602 is based, at least in part, on the detection of a defect 602 and an absence of detected input at the location of the defect 602. For example, if input is detected at locations near the defect 602, but not at the location of the defect 602, it may be determined that a first input is not possible.

In examples, the processing means 108 are configured to enable a second input. The second input may be received instead of or in combination with the first input. In examples, the processing means 108 are configured to enable the second input in dependence upon a determination that the first input is not possible due to the presence of a defect 602.

Figure 14A:
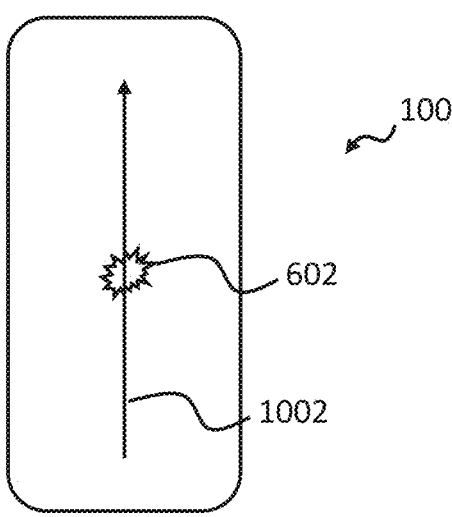
FIGS. 14A and 14B show another example of the subject matter described herein.
Figure 14B:
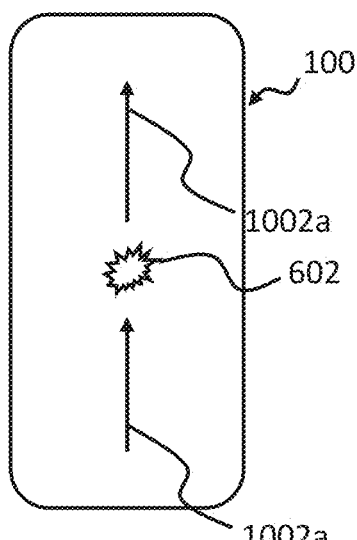

FIG. 14 illustrates an example in which a first input, in this example a swipe gesture 1002 to cause performance of a function, is not possible. The gesture 1002 of FIG. 14A moves over the defect 602. The apparatus 100 does not detect a touch input at the location of the defect 602 and therefore interprets the gesture 1002 as two curtailed swipe gestures 1002*a*, 1002*b*, as illustrated in FIG. 14B.

The processing means 108 enable a second input to cause performance of the function. In the example of FIG. 14B, the processing means 108 are configured to enable the recognition of the two curtailed swipe gestures 1002*a*, 1002*b* to be the second input.

Figure 17:
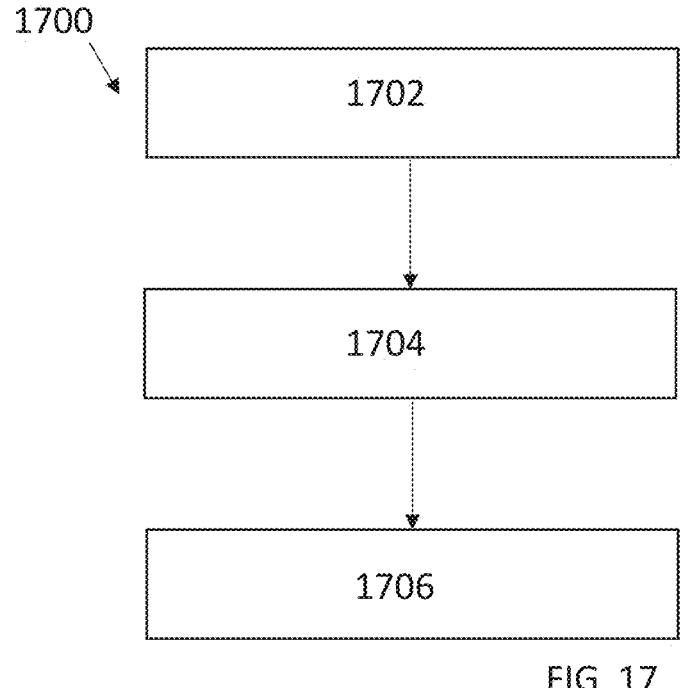
FIG. 17 shows another example of the subject matter described herein.

The apparatus 100 therefore comprises means for performing a method 1700 as set out in FIG. 17, the method 1700 comprising:

At block 1702, at a display module, output first light;

At block 1704, at a detector, detect the first light; and

At block 1706, at a processing means, detect one or more defects in the display module, based at least in part on the detected first light.

In examples, the apparatus 100 has a foldable form factor. The apparatus 100 has a hinge or other means of permitting folding of the device.

In some examples in which the apparatus 100 has a foldable form factor, the apparatus 100 comprises a single display module and a single detector, which extend across a fold of the apparatus 100.

In some such examples, the display module comprises a first portion and a second portion. The first display portion 102*a* and the second display portion 102*b* are separated by the fold.

In some such examples, the detector 106 comprises a first portion and a second portion. The first detector portion 106*a* and the second detector portion 106*b* are separated by the fold.

In examples, the first display portion 102*a* comprises the first detector portion 106*a* and the second display portion 102*b* comprises the second detector portion 106*b*.

In other examples in which the apparatus 100 has a foldable form factor, the apparatus 100 comprises a second display module. The display module and the second display module are separated by the fold.

The second display module comprises a plurality of planar layers, the layers comprising: a second cover layer; a second display; and a second detector. The second display is positioned between the second cover layer and the second detector. In examples, the second display module is a display module as described above.

FIGS. 15 and 16 illustrate examples of an apparatus 100 with a foldable form factor. FIGS. 15 and 16 and the description below refer to an apparatus 100 with a single display module having a first portion and a second portion and a single detector having a first portion and a second portion. It will be appreciated that FIGS. 15 and 16 and the below may also be applied to an apparatus 100 with a first display module and a second display module.

In examples, the means 1202 configured to determine a position of the apparatus 100 comprises means for determining an angle between the first portion of the display module and the second portion of the display module. In examples in which the apparatus 100 comprises a hinge, one or more sensors may be integrated into the hinge to detect the angle. Such sensors may comprise gauges, potentiometers, rotary encoders, or magnetic sensors. In such examples, the angle between the first portion and the second portion is output from the sensors.

Additionally or alternatively, the first portion and the second portion may comprise sensors. Such sensors may comprise: proximity sensors and/or optical sensors and/or sonic sensors configured to measure a distance between the first portion and the second portion; or motion and/or orientation sensors configured to measure changes in a position of the first portion and/or the second portion. In such examples, the angle between the first portion and the second portion is determined based on a comparison of the positions indicated by the respective sensors.

In FIG. 15, both first light 1202*a* and second light are 1202*b* are shown for illustrative purposes only. It will be appreciated that first light 1202*a* and second light 1202*b* may not coincide in time.

In examples, such as the example illustrated in FIG. 16A, the display module is configured to output the first light 104 at a first time t1 when an angle between the first portion of the display module and the second portion of the display module is a first angle $\alpha$(t1). The first light 104 is output from a first source 1202*a* having a first position $p(t_1)$. In some examples, the first source 1202*a* comprises a row of pixels.

The detector is configured to detect the first light 104. In examples, the detector is configured to determine features of the detected first light 104.

In examples, detecting and/or classifying one or more defects comprises comparing at least one of: an intensity, a wavelength, or a spatial distribution of the detected first light with at least one of: an intensity, a wavelength, or a spatial distribution of the first light.

The display module is configured to output second light at a second time t2 when the angle between the first portion of the display module and the second portion of the display module is a second angle $\alpha$(t2). The second light is output from a second source 1202*b* having a second position $p(t_2)$. In some examples, the second source 1202*b* comprises a row of pixels. The position of the second source 1202*b* is determined based on a difference between the first angle $\alpha$(t1) and the second angle $\alpha$(t2).

The detector is configured to detect the second light 162. In examples, the detector is configured to determine features of the detected second light 162.

In examples, detecting and/or classifying one or more defects comprises comparing at least one of: an intensity, a wavelength, or a spatial distribution of the detected second light with at least one of: an intensity, a wavelength, or a spatial distribution of the second light.

The processing means 108 are configured to detect and, optionally, classify one or more defects 602 in the display module, based at least in part on at least one of the detected first light 104 or the detected second light. In examples, detecting and/or classifying are performed at each of t1 and t2 as defined above.

In examples, if a defect 602 is detected at t1 and t2, then the defect 602 is likely to be positioned in the second portion of the display module (the portion configured to detect the first and second light). If a defect 602 is detected at one of t1 and t2 but not the other, then the defect 602 is likely to be positioned in the first portion of the display module (the portion configured to emit the first and second light).

In the above example, light is emitted and detected at a first time at a first angle $\alpha$(t1) and at a second time at a second angle $\alpha$(t2). More times and angles may be used.

In examples, the display module is configured to output third light when the first portion of the display module and the second portion of the display module are substantially parallel. In examples, both the first display portion 102*a* and the second display portion 102*b* are configured to output the third light.

In some such examples, the first display portion 102*a* and/or the second display portion 102*b* are configured to output the third light in dependence upon a determination that the position of the apparatus 100 is the first position.

The display module may be configured to output the third light in dependence on a determination that a defect 602 is present in the display module, based on the detected first and second light.

The detector is configured to detect the third light. In examples, both the first detector portion 106*a* and the second detector portion 106*b* are configured to detect the third light.

The processing means 108 are configured to detect and, optionally, classify one or more defects 602 in the display module, based at least in part on the detected third light, as described above with respect to the first light.

In examples, detecting and/or classifying one or more defects comprises comparing at least one of: an intensity, a wavelength, or a spatial distribution of the detected third light with at least one of: an intensity, a wavelength, or a spatial distribution of the third light.

Figure 18:
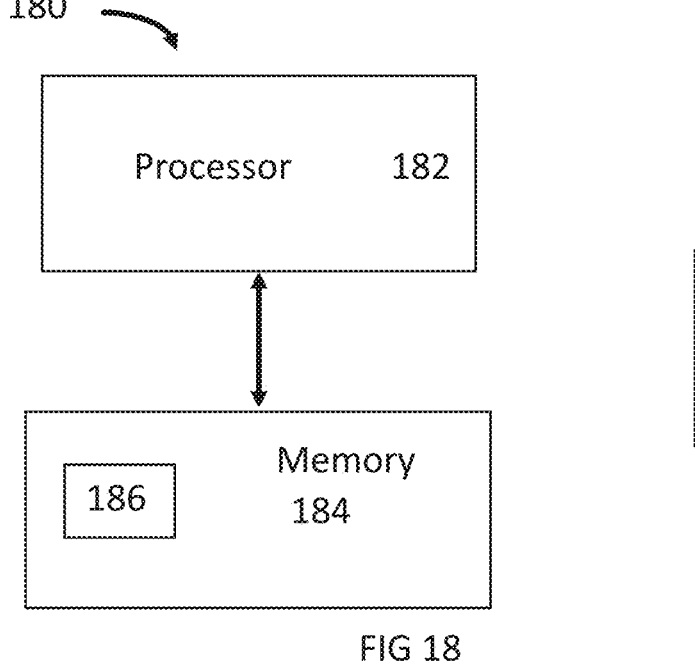
FIG. 18 shows another example of the subject matter described herein.

FIG. 18 illustrates an example of a controller 180 suitable for use in an apparatus 100. Implementation of a controller 180 may be as controller circuitry. The controller 180 may be implemented in hardware alone, have certain aspects in software including firmware alone or can be a combination of hardware and software (including firmware).

As illustrated in FIG. 18 the controller 180 may be implemented using instructions that enable hardware functionality, for example, by using executable instructions of a computer program 186 in a general-purpose or special-purpose processor 182 that may be stored on a computer readable storage medium (disk, memory etc) to be executed by such a processor 182.

The processor 182 is configured to read from and write to the memory 184. The processor 182 may also comprise an output interface via which data and/or commands are output by the processor 182 and an input interface via which data and/or commands are input to the processor 182.

The memory 184 stores a computer program 186 comprising computer program instructions (computer program code) that controls the operation of the apparatus 100 when loaded into the processor 182. The computer program instructions, of the computer program 186, provide the logic and routines that enables the apparatus to perform the methods illustrated in the accompanying Figs. The processor 182 by reading the memory 184 is able to load and execute the computer program 186.

The apparatus 100 comprises:

at least one processor 182; and at least one memory 184 including computer program code the at least one memory 184 and the computer program code configured to, with the at least one processor 182, cause the apparatus 100 at least to perform:

at a display module, outputting first light;

at a detector, detecting the first light; and at a processing means, detecting one or more defects in the display module, based at least in part on the detected first light.

The apparatus 100 comprises:

at least one processor 182; and at least one memory 184 storing instructions that, when executed by the at least one processor 182, cause the apparatus at least to:

at a display module, output first light;

at a detector, detect the first light; and at a processing means, detect one or more defects in the display module, based at least in part on the detected first light.

Figure 19:
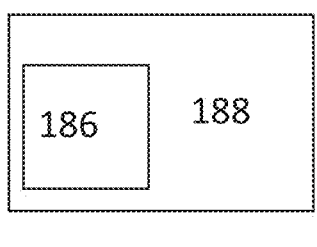
FIG. 19 shows another example of the subject matter described herein.

As illustrated in FIG. 19, the computer program 186 may arrive at the apparatus 100 via any suitable delivery mechanism 188. The delivery mechanism 188 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 186. The delivery mechanism may be a signal configured to reliably transfer the computer program 186. The apparatus 100 may propagate or transmit the computer program 186 as a computer data signal.

Computer program instructions for causing an apparatus to perform at least the following or for performing at least the following:

at a display module, outputting first light;

at a detector, detecting the first light; and at a processing means, detecting one or more defects in the display module, based at least in part on the detected first light.

The computer program instructions may be comprised in a computer program, a non-transitory computer readable medium, a computer program product, a machine readable medium. In some but not necessarily all examples, the computer program instructions may be distributed over more than one computer program.

Although the memory 184 is illustrated as a single component/circuitry it may be implemented as one or more separate components/circuitry some or all of which may be integrated/removable and/or may provide permanent/semi-permanent/dynamic/cached storage.

Although the processor 182 is illustrated as a single component/circuitry it may be implemented as one or more separate components/circuitry some or all of which may be integrated/removable. The processor 182 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the accompanying Figs may represent steps in a method and/or sections of code in the computer program 186. The illustration of a particular order to the blocks does not necessarily imply that there is a required or preferred order for the blocks and the order and arrangement of the block may be varied. Furthermore, it may be possible for some blocks to be omitted.

In some but not necessarily all examples, the apparatus 100 is configured to communicate data from the apparatus 100 with or without local storage of the data in a memory 184 at the apparatus 100 and with or without local processing of the data by circuitry or processors at the apparatus 100.

The data may, for example, be data obtained by the detector, or data produced by the processing of data obtained by the detector, such as, for example, features of the detected light.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long-range cellular radio links. The apparatus may comprise a communications interface such as, for example, a radio transceiver for communication of data.

The apparatus 100 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 100 where it may produce an output sensible to the subject such as an audio output, visual output or haptic output.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

The systems, apparatus, methods and computer programs may use machine learning which can include statistical learning. Machine learning is a field of computer science that gives computers the ability to learn without being explicitly programmed. The computer learns from experience E with respect to some class of tasks T and performance measure P if its performance at tasks in T, as measured by P, improves with experience E. The computer can often learn from prior training data to make predictions on future data. Machine learning includes wholly or partially supervised learning and wholly or partially unsupervised learning. It may enable discrete outputs (for example classification, clustering) and continuous outputs (for example regression). Machine learning may for example be implemented using different approaches such as cost function minimization, artificial neural networks, support vector machines and Bayesian networks for example. Cost function minimization may, for example, be used in linear and polynomial regression and K-means clustering. Artificial neural networks, for example with one or more hidden layers, model complex relationship between input vectors and output vectors. Support vector machines may be used for supervised learning. A Bayesian network is a directed acyclic graph that represents the conditional independence of a number of random variables.

The above-described examples find application as enabling components of:

automotive systems; telecommunication systems; electronic systems including consumer electronic products;

distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:
   a display module configured to output a first light;
   a detector configured to detect the first light; and
   a defect detector for detecting one or more defects in the display module, based at least in part on the detected first light;
   wherein the defect detector is configured to classify the detected one or more defects in the display module, based at least in part on the detected first light;
   wherein the defect detector is configured to determine a transfer function wherein the first light is an input to the transfer function and the detected first light is an output from the transfer function, and wherein at least one of the detecting or classifying the one or more defects comprises comparing an expected transfer function with the determined transfer function.

2. The apparatus as claimed in claim 1, wherein the defect detector is configured to detect one or more defects which are present in a portion of, but not the whole, display module.

3. The apparatus as claimed in claim 1, wherein the display module comprises a plurality of planar layers, the planar layers comprising:
   a cover layer;
   a display; and
   the detector;
   wherein the display is positioned between the cover layer and the detector.

4. The apparatus as claimed in claim 3, wherein the display module further comprises an input layer configured to detect a user input, the user input comprising at least one of a touch input or a proximity input.

5. The apparatus as claimed in claim 1, wherein the defect detector comprises a trained machine learning model configured to classify the detected one or more defects, based at least in part on the detected first light.

6. The apparatus as claimed in claim 5, wherein classifying a defect comprises determining at least one of:
   a defect type of the defect; or
   a defect location of the defect.

7. The apparatus as claimed in claim 6, wherein a defect type of is one of:
   a cracked cover layer;
   a display defect; or
   a delamination of layers.

8. The apparatus as claimed in claim 6, wherein a defect location is at least one of:
   a lateral position indicating a position of the defect within a plane parallel to a planar face of the display module; or
   a transverse position indicating one or more layers of the display module in which the defect is present.

9. The apparatus as claimed in claim 1, wherein at least one of detecting or classifying one or more defects comprises comparing at least one of: an intensity, wavelength, or a spatial distribution of the detected first light with at least one of: an intensity, a wavelength, or a spatial distribution of the first light.

10. The apparatus as claimed in claim 1, wherein the defect detector is configured to adapt a function of the display module, based at least in part on the detected first light.

11. The apparatus as claimed in claim 10, wherein adapting a function of the display module comprises at least one of:

changing a display output of the display module; or changing a detection configuration of the input layer.

12. The apparatus as claimed in claim 11, wherein changing a display output of the display module comprises changing at least one of: a position, a shape, a color, or a size of a visual object displayed on the display module.

13. The apparatus as claimed in claim 12, wherein the defect detector is configured to change at least one of: a position, a shape, or a size of a visual object on the display module in response to a determination that the visual object is co-located with a defect.

14. The apparatus as claimed in claim 12, wherein changing a detection configuration of the input layer comprises:

determining that a user input object is co-located with a defect; and changing at least one of: a position, a shape, a color, or a size of the user input object.

15. The apparatus as claimed in claim 12, wherein changing a detection configuration of the input layer comprises:

determining that a first input is not possible due to the presence of a defect; and enabling a second input.

16. The apparatus as claimed in claim 1, wherein a planar size and shape of the detector is substantially equal to a planar size and shape of the display, and the detector is positioned relative to the display such that a planar face of the display and a planar face of the detector overlap completely.

17. The apparatus as claimed in claim 1, wherein the display module is removeable and replaceable.

18. The apparatus as claimed in claim 1, further comprising an angle determiner configured to determine at least one of a position or an orientation of the apparatus, wherein the display module is configured to output the first light in dependence upon a determination that the position of the apparatus is a first position.

19. An apparatus, comprising:

a display module configured to output a first light;

a detector configured to detect the first light; and a defect detector for detecting one or more defects in the display module, based at least in part on the detected first light;

wherein the defect detector is configured to adapt a function of the display module, based at least in part on the detected first light;

wherein adapting a function of the display module comprises at least one of: changing a display output of the display module, or changing a detection configuration of the input layer;

wherein changing a display output of the display module comprises changing at least one of: a position, a shape, a color, or a size of a visual object displayed on the display module.

20. An apparatus, comprising:

a display module configured to output a first light;

a detector configured to detect the first light; and a defect detector for detecting one or more defects in the display module, based at least in part on the detected first light;

wherein a planar size and shape of the detector is substantially equal to a planar size and shape of the display, and the detector is positioned relative to the display such that a planar face of the display and a planar face of the detector overlap completely.

* * * * *